US012158032B2

(12) United States Patent
Tsukamoto

(10) Patent No.: US 12,158,032 B2
(45) Date of Patent: Dec. 3, 2024

(54) DOOR GUIDING DEVICE

(71) Applicant: SUGATSUNE KOGYO CO., LTD., Tokyo (JP)

(72) Inventor: Koichi Tsukamoto, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 0 days.

(21) Appl. No.: 18/042,603

(22) PCT Filed: Jul. 12, 2021

(86) PCT No.: PCT/JP2021/026102
§ 371 (c)(1),
(2) Date: Feb. 23, 2023

(87) PCT Pub. No.: WO2022/044577
PCT Pub. Date: Mar. 3, 2022

(65) Prior Publication Data

US 2023/0340820 A1 Oct. 26, 2023

(30) Foreign Application Priority Data

Aug. 28, 2020 (JP) ................................. 2020-144451
Mar. 11, 2021 (JP) ................................. 2021-038888

(51) Int. Cl.
*E05D 15/58* (2006.01)
*E06B 3/50* (2006.01)

(52) U.S. Cl.
CPC ................ *E05D 15/58* (2013.01); *E06B 3/50* (2013.01); *E06B 3/5045* (2013.01)

(58) Field of Classification Search
CPC . E05D 15/58; E05D 2015/586; E05D 15/264; E06B 3/5045; E06B 3/50
See application file for complete search history.

(56) References Cited

U.S. PATENT DOCUMENTS 3,017,233 A * 1/1962 Gates .................... E06B 3/5045 16/98
3,456,995 A * 7/1969 Nyquist ................ E06B 3/5045 312/331

(Continued)

FOREIGN PATENT DOCUMENTS

CN 108086842 A 5/2018
CN 110454021 A 11/2019

(Continued)

OTHER PUBLICATIONS

English translation of WO-2020097641-A1 (Year: NA).*

(Continued)

*Primary Examiner* — Justin B Rephann
(74) *Attorney, Agent, or Firm* — MASUVALLEY & PARTNERS; Peter Martinez

(57) ABSTRACT

The door guiding device 5 for a push-in type door comprises a plurality of guiding rails 10 extending horizontally along a back-and-forth direction while being apart up-and-down from each other and being fixed to the lateral wall 1*b* of the receiver body 1; a plurality of sliders 20 each supported by the plurality of guiding rails 10 slidably to the front and rear direction; in interlocking frame 30 extending vertically (vertical frame) and being linked with the plurality of the sliders; and a hinge mechanism 50 disposed to the slider or the interlocking frame 30 for supporting the door 2 rotatably about the rotational axis line. One end of a turnbuckle 60 (support member) is linked with the slider 20 and another end is linked with the interlocking frame 30. A position of the forward-inclined door 2 by a deadweight is corrected to a vertical standing position by the turnbuckle 60.

11 Claims, 17 Drawing Sheets

(56) References Cited

U.S. PATENT DOCUMENTS

| | | | | | |
|---|---|---|---|---|---|
| 4,729,612 | A * | 3/1988 | Stone | E06B 3/5045 | 312/109 |
| 4,815,797 | A * | 3/1989 | Haab | E05D 15/58 | 49/257 |
| 5,108,165 | A * | 4/1992 | Rorke | A47B 96/00 | 312/322 |
| 5,131,449 | A * | 7/1992 | Winn | E06B 3/5045 | 160/214 |
| 5,149,180 | A * | 9/1992 | Haab | E05D 15/58 | 312/331 |
| 5,395,165 | A * | 3/1995 | Woerner | E05D 15/58 | 211/27 |
| 5,758,937 | A * | 6/1998 | Lammens | E05D 15/582 | 49/386 |
| 7,090,318 | B2 * | 8/2006 | Brown | E05D 15/58 | 312/110 |
| 7,959,242 | B2 * | 6/2011 | Del Castillo | E05D 15/58 | 312/319.1 |
| 9,284,761 | B2 * | 3/2016 | Haab | E05D 13/00 | |
| 9,894,996 | B1 * | 2/2018 | Grela | E05D 15/48 | |
| 10,227,806 | B2 * | 3/2019 | Gabl | E05F 1/16 | |
| 10,947,763 | B2 * | 3/2021 | Blum | E05D 15/264 | |
| 2004/0100170 | A1 * | 5/2004 | Brown | E05D 15/58 | 312/322 |
| 2004/0100171 | A1 * | 5/2004 | Brown | E06B 3/5045 | 312/322 |
| 2004/0239216 | A1 * | 12/2004 | Castillo | E05D 15/58 | 312/322 |
| 2004/0252045 | A1 * | 12/2004 | Wu | E05D 15/58 | 341/176 |
| 2006/0255699 | A1 * | 11/2006 | Punzel | A47B 81/005 | 312/217 |
| 2008/0218043 | A1 * | 9/2008 | Gianelo | A47B 43/00 | 312/319.2 |
| 2010/0270898 | A1 * | 10/2010 | Haab | E05D 15/58 | 312/323 |
| 2013/0232878 | A1 * | 9/2013 | Bortoluzzi | E05D 15/58 | 49/252 |
| 2017/0241178 | A1 * | 8/2017 | Gabl | E05F 1/16 | |
| 2018/0125236 | A1 * | 5/2018 | Grela | E05D 11/00 | |
| 2019/0301218 | A1 * | 10/2019 | Rupp | E05D 15/264 | |
| 2020/0048947 | A1 * | 2/2020 | Blum | E05D 15/264 | |
| 2021/0262268 | A1 * | 8/2021 | Goetz | E05D 15/58 | |

FOREIGN PATENT DOCUMENTS

| | | | | | |
|---|---|---|---|---|---|
| JP | H06-058040 | A | 3/1994 | | |
| JP | H11-343767 | A | 12/1999 | | |
| JP | 2020-514588 | A | 5/2020 | | |
| WO | WO-2020097641 | A1 * | 5/2020 | E05D 15/264 | |

OTHER PUBLICATIONS

Microfilm of the specification and drawings annexed to the request of Japanese Utility Model Application No. 98885/1989, Laid-open No. 98885/1989, Matsushita Electric Works, Ltd., Jul. 3, 1989, 11 pages.

WIPO, Japanese International Search Authority, International Search Report mailed Aug. 3, 2021 in International Patent Application No. PCT/JP2021/026102, 2 pages.

European Patent Office, Extended European Search Report dated Aug. 29, 2024 in European Patent Application No. 21861007.9, 8 pages.

* cited by examiner

DOOR GUIDING DEVICE

RELATED APPLICATIONS

This application is the U.S. National Phase of and claims priority to International Patent Application No. PCT/JP2021/026102, International Filing Date Jul. 12, 2021, entitled Door Guide Device which claims priority to Japan Application No. 2021-038888 filed Mar. 11, 2021 and Japan Application No. 2020-144451 filed Aug. 28, 2020, all of which are incorporated herein by reference in their entireties.

TECHNICAL FIELD

The present invention relates to a door-guiding device for a push-in type door.

BACKGROUND ART

In furniture etc., it is known the configuration that makes a door receive in a housing by pushing inside from an open position along a lateral wall of the housing. A device for guiding the push-in type door, as disclosed in Patent Literature 1 described below, comprises upper and lower guiding rails fixed to an inner face of the lateral wall of the housing while extending horizontally to a back-and-forth direction, sliders supported slidably toward the back-and-forth direction by these guiding rails, an interlinking frame extending vertically and being linked with the upper and lower sliders, and upper and lower hinge mechanisms disposed to the interlocking frame for supporting rotatably the door.

The door-guiding device of Patent Literature 1 further comprises two back-and-forth vertical rails and a linking mechanism so as to hold the door in a vertical standing position by setting the rotational axis line of door vertical. The vertical rail at a front side is fixed to the interlocking frame and the vertical rail at a rear side is fixed to the inner face of lateral wall of the housing at the inside of the housing. The linking mechanism forms, for example, an X-shape with linking the centers of first and second two links rotatably. Rear ends of two links are supported runnably by the vertical rail of the rear side. The front end of the first link is supported non-runnably and rotatably by the vertical rail at the front side, and the front end of the second link is supported runnably by the vertical rail at the front side. When pushing-in the door from the open position, the interlocking frame moves inside while the upper and the lower sliders slide along the guiding rails. With this process, the link mechanism can be folded.

PRIOR ART LITERATURE

Patent Literature

Patent Literature 1 JPH 6-58040

SUMMARY OF INVENTION

Problem Solved by Invention

The door guiding device of Patent Literature 1 was large and high costs due to the provision of two vertical rails and the linking mechanism.

Means for Solving Problem

The present invention is completed for solving the above problem and the present invention is characterized in that a door guiding device for supporting a door for opening and closing an opening of a receiver body rotatably about a rotational axis line extending to an up-and-down direction while guiding inside from an opening position along a lateral wall of the receiver body comprises:

a plurality of guiding rails extending horizontally along a back-and-forth direction, while being apart up-and-down from each other and being fixed to the lateral wall of the receiver body, a vertical frame linked with the plurality of the sliders, and a hinge mechanism disposed to the slider or the vertical frame for supporting the door rotatably about the rotational axis line, wherein a support component for keeping an angle between the slider and the vertical frame at an angle for setting the rotational axis line vertical is disposed between at least one of the sliders and the vertical frame.

According to the above configuration, the door can be supported stably at the vertical standing position by the support component disposed between the vertical frame and the sliders. Furthermore, the linking mechanism with a large size can be omitted so that lower costs may be promoted.

Preferably, the support component comprises an adjustment component for correcting the angle between the slider and the vertical frame so as to correct the door to a vertical standing position by setting the rotational axis line vertical.

According to the above configuration, the door can be corrected to the vertical standing position by the adjusting component after disposing the door to a receiver body through the door guiding device.

Preferably, the support component comprises at least one support member, and the adjustment component is configured such that a linking position between the at least one support member and the slider or the vertical frame is allowed to be adjusted.

According to the above configuration, the door position can be corrected with relative ease by the adjustment of linking position.

Preferably, the adjustment component comprises a long hole formed to the slider or to the vertical frame and an engagement shaft part being disposed to the at least one support member and passing through the long hole, and a plurality of engagement recesses is formed at an edge of the long hole, and the engagement shaft part engages selectively with any one of the plurality of the engagement recesses.

According to the above configuration, the adjustment of linking position may be achieved easily.

Preferably, at least one support member is consisted of one support member and the support member is linked with the slider through a first end and is linked with the vertical frame through a second end.

According to the above configuration, the configuration of support component may be further simplified.

Preferably, a line connecting the first end and the second end of the support member is inclined. According to this configuration, the vertical standing position of door may be kept further stably.

In one embodiment, the first end of the support member is linked with the slider at a position apart from the vertical frame.

According to the above configuration, since a length between the linking position of slider with the vertical frame and the linking position of slider with the support component may be set longer, even though the door is heavy, the vertical standing position of the door may be kept stably by the support component.

In another embodiment, the support member overlaps to the vertical frame and the first end is linked to the slider without restriction from the vertical frame.

According to the above configuration, since the length of slider may be set shorter, the protrusion amount of the door from the receiver body may be reduced under the condition where the door is pushed into the receiver body.

The support component may adopt the following embodiment. That is, the at least one support member comprises a first support member and a second support member and the first support member extends to a longitudinal direction of the vertical frame, the vertical frame is rotatably linked with the slider at a first linking point, the first support member is rotatably linked with the slider at a second linking point apart from the first linking point in a back-and-forth direction, one end of the second support member is rotatably linked with the first support member at a third linking point apart from the second linking point in an up-and down direction and the adjustment component comprises the long hole formed to the vertical frame and the engagement shaft disposed to another end of the second support member such that the engagement shaft part is provided as a fourth linking point for linking the second support member and the vertical frame.

In one embodiment of the support component, the first support member and the second support member are overlapped to the vertical frame. In another embodiment, the first support member is disposed apart from the vertical frame in a back-and-forth direction and the second support member is spanned between the first support member and the vertical frame.

In further another embodiment, the support component is linked with the slider through a first end and is linked with the vertical frame through a second end, and the adjustment component is configured so as to adjust a length of the support member.

According to the above configuration, the position of the door can be corrected by adjusting the length of the support member.

More preferably, the support member is consisted of a turnbuckle. According to this configuration, the door position may be corrected with simple operations.

Other embodiments of the present invention is characterized in that a door guiding device for supporting a door for opening and closing an opening of a receiver body rotatably about a rotational axis line extending to an up-and-down direction while guiding inside from an opening position along a lateral wall of the receiver body, the door guiding device comprises:

at least one guiding rail extending horizontally along a back-and-forth direction and being fixed to the lateral wall of the receiver body, a slider supported by the at least one guiding rail slidably to the front and rear direction, a vertical frame linked with the slider, a hinge mechanism disposed to the vertical frame for supporting the door rotatably about the rotational axis line, wherein a support component for keeping an angle between the slider and the vertical frame at an angle setting the rotational axis line vertical is disposed between the slider and the vertical frame.

Advantage of Invention

The door guiding device of the present invention supports the door rotatably and stably, and furthermore the configuration becomes small and low costs.

EMBODIMENT FOR PRACTICING INVENTION

First Embodiment

Now, a first embodiment of the present invention will be described with reference to FIG. 1-FIG. 4. Furniture shown in FIG. 1 comprises a housing 1 (receiver body) and a push-in type door 2. In the following description, an opening 1*a* side of the housing 1 is referred to a front side and the inside of the housing 1 is referred to the rear side. To the housing 1, a partition wall 1*c* is formed parallel to, for example, a right-lateral wall 1*b*, and a door-receiving space 1*d* is formed between these right-lateral wall 1*b* and the partition wall 1*c*. At an entrance of the door-receiving space 1*d*, a roller 3, for guiding a lateral face of the door 2 when drawing-out, is disposed with leaving a space from an inside face of the lateral wall 1*b*. Now, the partition wall 1*c* may be omitted.

Figure 2:
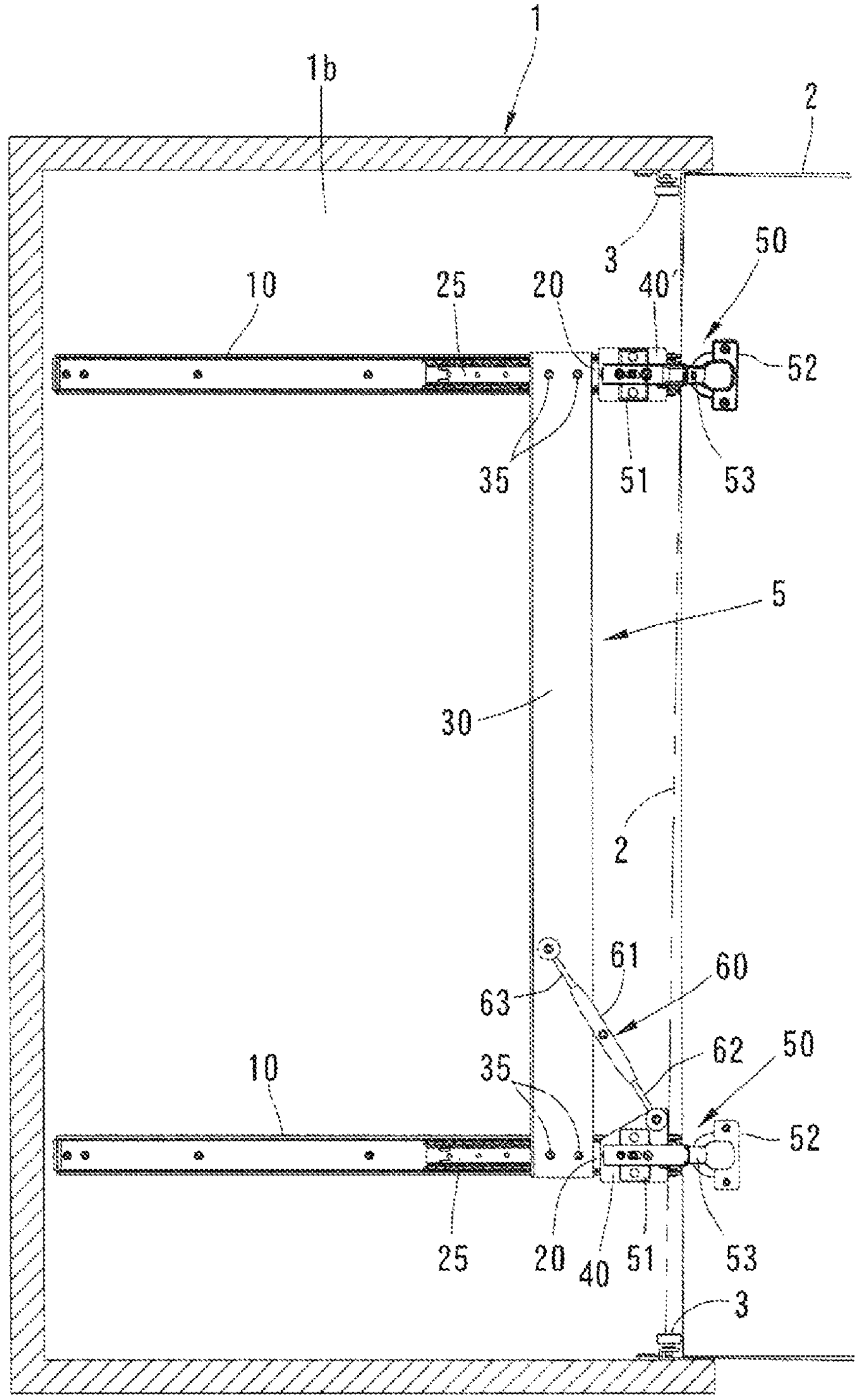
FIG. 2 shows a side view of the door guiding device with illustrated by omitting a partition wall of the housing.

As shown in FIG. 2, the door-guiding device 5 comprises two (plural) guiding rails 10 fixed to the inner face of the lateral wall 1*b* of the housing 1. These guiding rails 10 extend horizontally along the back-and-forth direction while leaving spacings vertically each other. To each of the guiding rails 10, a slider 20 is supported slidably along a longitudinal direction (back-and-forth direction) of the guiding rail 10. According to the present embodiment, the slider 20 is supported through a ball retainer 25 to the guiding rail 10 or is supported by the guiding rail 10 directly without intervening the ball retainer 25.

Figure 4:
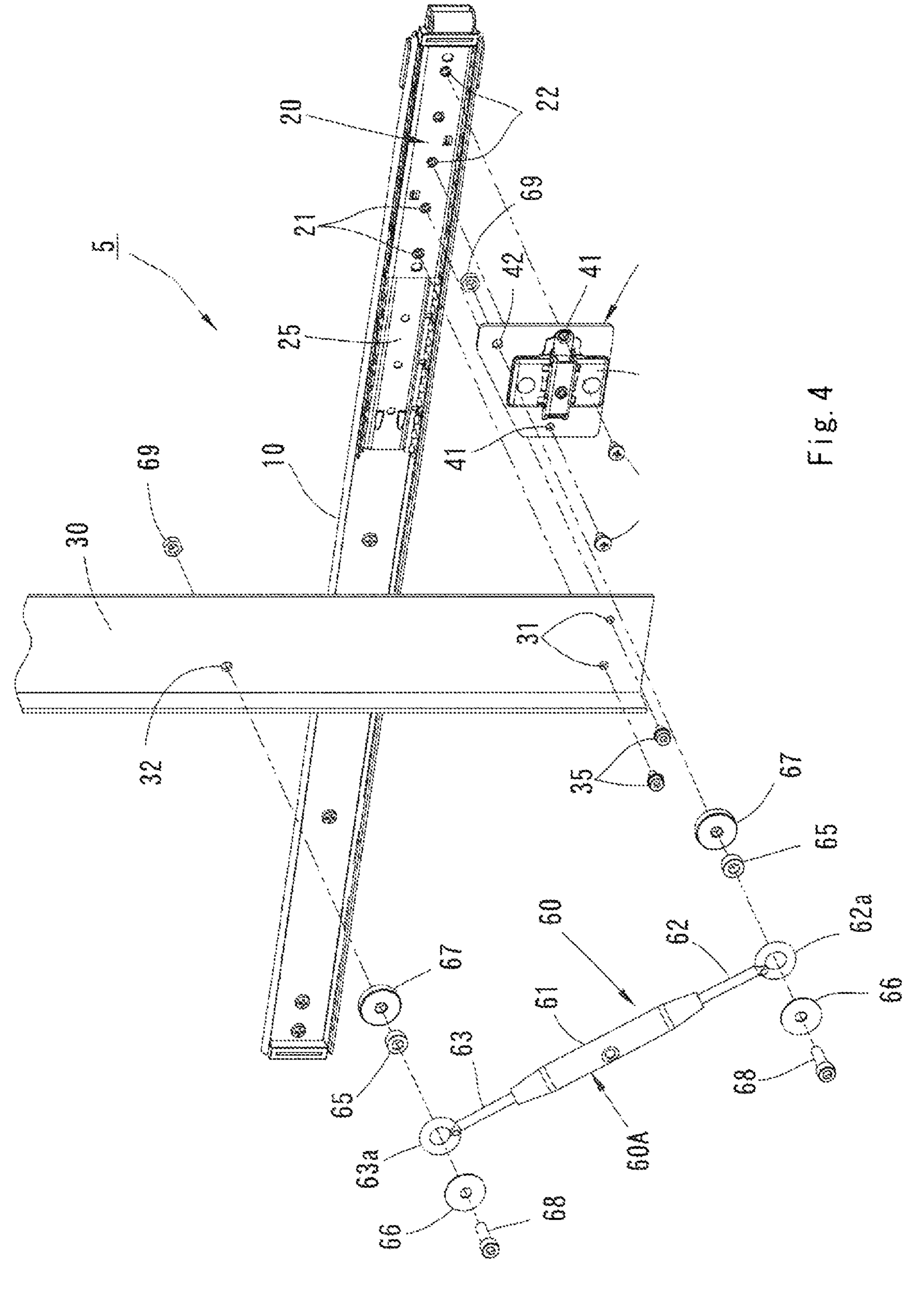
FIG. 4 is an exploded perspective view of the elemental parts of the door guiding device.

The door-guiding device 5 comprises an interlocking frame 30 (vertical frame) having an L-shaped cross-section for making the upper and lower sliders 20 interlock. The interlocking frame 30 extends approximately vertically and its upper and lower ends are linked with the rears of the upper and lower sliders 20, respectively. In detail, as shown in FIG. 4, two screw holes 21 with the spacing along back-and-forth are formed at the rear of the lower slider 20, and at the lower end of the interlocking frame 30, two circular holes 31 with the spacing along back-and-forth are formed. By screwing-in a screw 35 passing through these circular holes 31 to the screw holes 21 of the slider 20, the lower end of the interlocking frame 30 is linked with the rear of the slider 20. The upper end of the interlocking frame 30 is also linked similarly to the rear of the upper slider 20.

The upper and lower sliders 20 have linking brackets 40, 40' formed from plates at their respective fronts. In detail, as shown in FIG. 4, to the front of the body of the lower slider 20, two screw holes 22 are formed with leaving the spacing along back-and-forth. The lower linking bracket 40 has a trapezoid shape and two circular holes 41 spaced along back-and-forth are formed at its medial height. By screwing screws 45 passing through these circular holes 41 to the screw holes 22 of the slider 20, the linking bracket 40 is fixed to the front of the body of the slider 20. This linking bracket 40 is provided as a part of the slider 20. The upper linking bracket 40' has a rectangle shape and is fixed to the front of the upper slider 20 as similar to the above.

Figure 3:
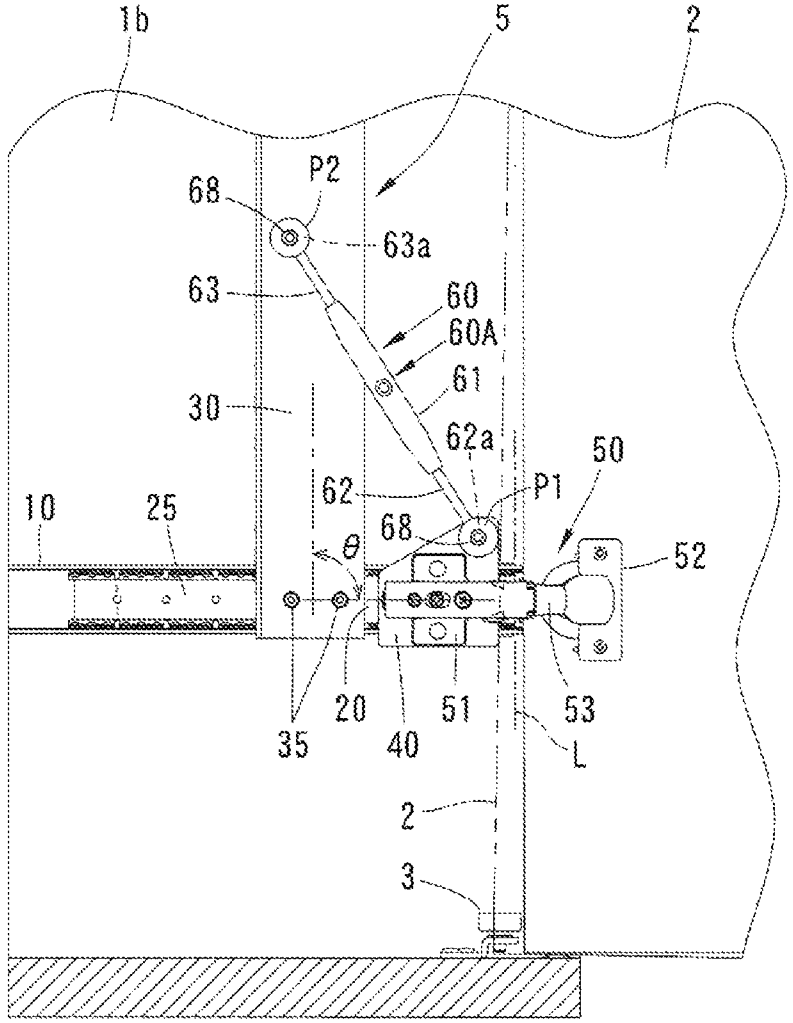
FIG. 3 is a side view showing enlarged elemental parts of the door guiding device.

To each of the upper and lower linking brackets 40, 40', a hinge mechanism 50 is disposed. The hinge mechanism 50 of the present embodiment comprises a housing-side hinge body 51 fixed to the linking brackets 40, 40', a door-side hinge body 52 fixed to an inner face near around a right edge of the door 2, and a plurality of links 53 for linking these hinge bodies 51, 52. The hinge mechanism 50 supports the door 2 rotatably about four rotational axis lines extending vertically (in FIG. 3, schematically illustrated by one rotational axis line L). Here, these rotational axis lines move together with the open and close of the door 2.

As shown in FIG. 2 and FIG. 3, the door guiding device 5 comprises a turnbuckle 60 (support member; support component) at its lower end. As shown in FIG. 4, the turnbuckle 60 includes an operation cylinder 61 having a cylinder shape and two screw rods 62, 63 screwed to this operation cylinder 61 and extending along a straight line. To inner circumferences of both ends of the operation cylinder 61, female screws forming reversed threads each other are formed, and the male screws of the screw rod 62, 63 are screwed into the female screws. The male screws of these screw rods 62, 63 and the operation cylinder 61 form an adjustment component 60A for adjusting a length of the turnbuckle 60. The screw rods 62, 63 include ring parts 62*a*, 63*a* at their outer ends. When the operation cylinder 61 is turned to one direction, the turnbuckle 60 becomes long while making the ring parts 62*a*, 63*a* apart while turning to another direction makes the turnbuckle 60 short to make the ring part 62*a*, 63*a* nearby.

The ring part 62*a* at the one end of the turnbuckle 60 is linked rotatably to the upper end of the lower linking bracket 40. In detail, a collar 65 is received in the ring part 62*a* and to both sides of the ring part 63*a* a washer 66 and a spacer 67 are disposed. By inserting a screw 68 passing through these collar 65, washer 66, and spacer 67 into the circular hole 42 formed at the upper end of the linking bracket 40, and then by tightening by the screw 68 and a nut 69 disposed at opposite side of the linking bracket 40, the ring part 62*a* is linked rotatably to the upper end of the linking bracket 40. In FIG. 3, the sign P1 is provided to this linkage part (first linkage part; first end).

The ring part 63*a* of another end of the turnbuckle 60 is linked rotatably to the interlocking frame 30 at a certain distance upward from the lower slider 20. In detail, the ring part 63*a*, as similar to the ring part 62*a*, by inserting a screw 68 passing through these collar 65, washer 66, and spacer 67 into the circular hole 32 formed to the interlocking frame 30, and then by tightening by the screw 68 and a nut 69 disposed at opposite side of the interlocking frame 30, is linked rotatably to the interlocking frame 30. In FIG. 3, the sign P2 is provided to this linkage part (second linkage part; second end).

Actions of the door guiding device 5 forming the above configuration will be described. When the door 2 is in a close position, the upper and lower sliders 20 and the hinge mechanisms 50 are positioned near to the opening 1*a* of the housing 1. By rotating the door 2 by 90 degrees, the door 2 reaches to an open position of FIG. 1A. When the door 2 is pushed-in from this open position, the upper and lower hinge mechanisms 50, the upper and lower sliders 20 and the interlocking frame 30 of the door guiding device 5 move integrally to the inside so as to guide the door 2 toward the receiving position shown in FIG. 1B. As the result, most of the door 2 is received in the door receiving space 1*d*.

Figure 1A:
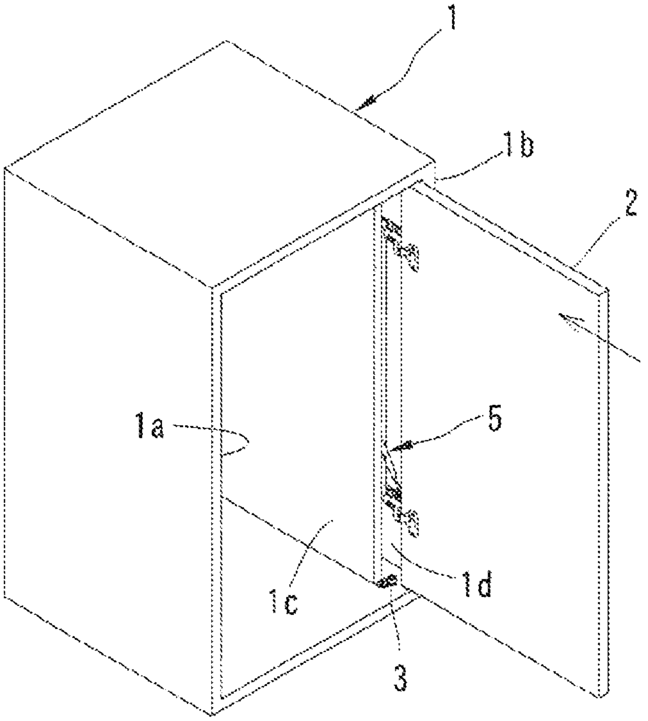
FIG. 1A shows a perspective view of furniture equipping a door guiding device of a first embodiment of the present invention and illustrates the condition where the door is in an opened position at 90 degrees.
Figure 1B:
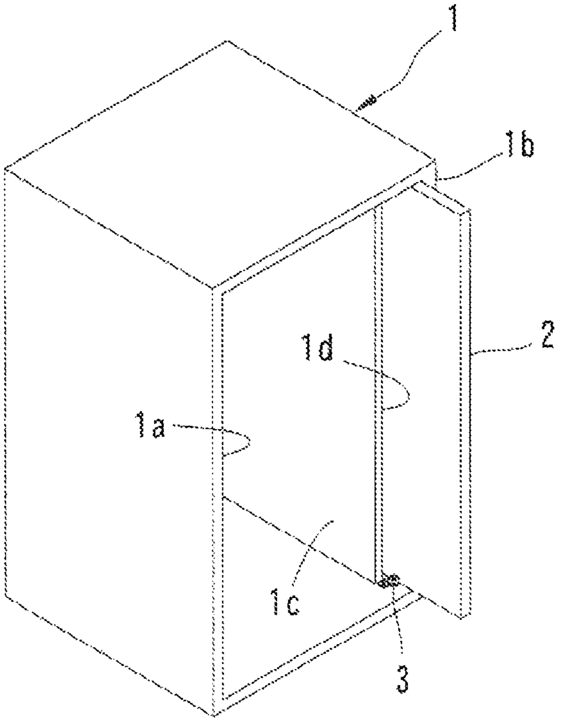
FIG. 1B is a drawing corresponding to FIG. 1A and illustrates the condition where the door is received in a housing.

When the opening 1*a* of the housing 1 is closed, the door 2 is drawn out through the guidance of the door guiding device 5 to go back to the 90 degrees opened position shown in FIG. 1A and further then to rotate the door 2 to the close position.

The door guiding device 5 is designed so as to make the rotational axis line L vertical for supporting the door 2 at the vertical standing position rotatably about the rotation axis line L. However, practically due to machinery play between the guiding rail 10, or machinery play between the slider 20, the screw 35 and the circular hole 31 at the linking part of the interlocking frame 30 and the like, the door 2 becomes the forward-inclined position by its deadweight as illustrated by imaginary lines shown in FIG. 2 and FIG. 3 such that the rotational axis line L is not kept vertical. Thus, the open-close function is disrupted.

According to the present embodiment, the adjustment of the turnbuckle 60 can correct the forward-inclined position of the door 2 to the vertical standing position to set the rotational axis line L to be vertical. Hereafter, detail will be detailed.

The turnbuckle 60 may be set to the length such that, for example, the slider 20 and the interlocking frame 30 make the right angle in its design, and both ends thereof are linked with the interlocking frame 30 and the linking bracket 40. The screw 35 for linking the upper and lower sliders 20 and the interlocking frame 30 are loosened. In this condition, the door 2 becomes the forward-inclined position by its dead-weight (shown by imaginary lines in FIG. 2 and FIG. 3), and the rotational axis lines L are inclined. The position of the door 2 is corrected by adjusting the length of the turnbuckle 60 while rotating the operation cylinder 61 of the turnbuckle 60. According to the present embodiment, by extending the turnbuckle 60 to adjust the angle Θ (refer to FIG. 3) between the slider 20 and interlocking frame 30; the door 2 is corrected to the vertical standing position (shown by solid lines in FIG. 2 and FIG. 3); and as shown in FIG. 2 and FIG. 3, the rotational axis lines L are returned substantially vertical.

As described above, the positional correction of the door 2 can be achieved easily sorely by rotating the operation cylinder 61 of the turnbuckle 60. When this correction work is completed, the screw 35 is tightened. Here, when there is machinery play between the screw 45 and the circular hole 41, the screw 45 is also loosened prior to the correction work by the turnbuckle 60, and then is tightened after completion of the adjustment work.

After the position correction of the door 2, the angle Θ between the slider 20 and the interlocking frame 30 is kept by the turnbuckle 60 at the angle that the rotational axis line L becomes substantially vertical and the door 2 becomes the vertical standing position. Thus, the door 2 can be opened and closed stably for long term.

By the usage of the turnbuckle 60, a complex and large sized link mechanism such as a conventional door guiding device can be omitted so that the above position correction work may also be performed easily.

According to the present embodiment, the linkage parts P1, P2 can be made sufficiently apart toward the back-and-forth direction so that the inclination angle of the turnbuckle 60 can be brought large. Thus, even if the weight of the door 2 is large, the above angle retention function can be performed.

Second Embodiment

Figure 5:
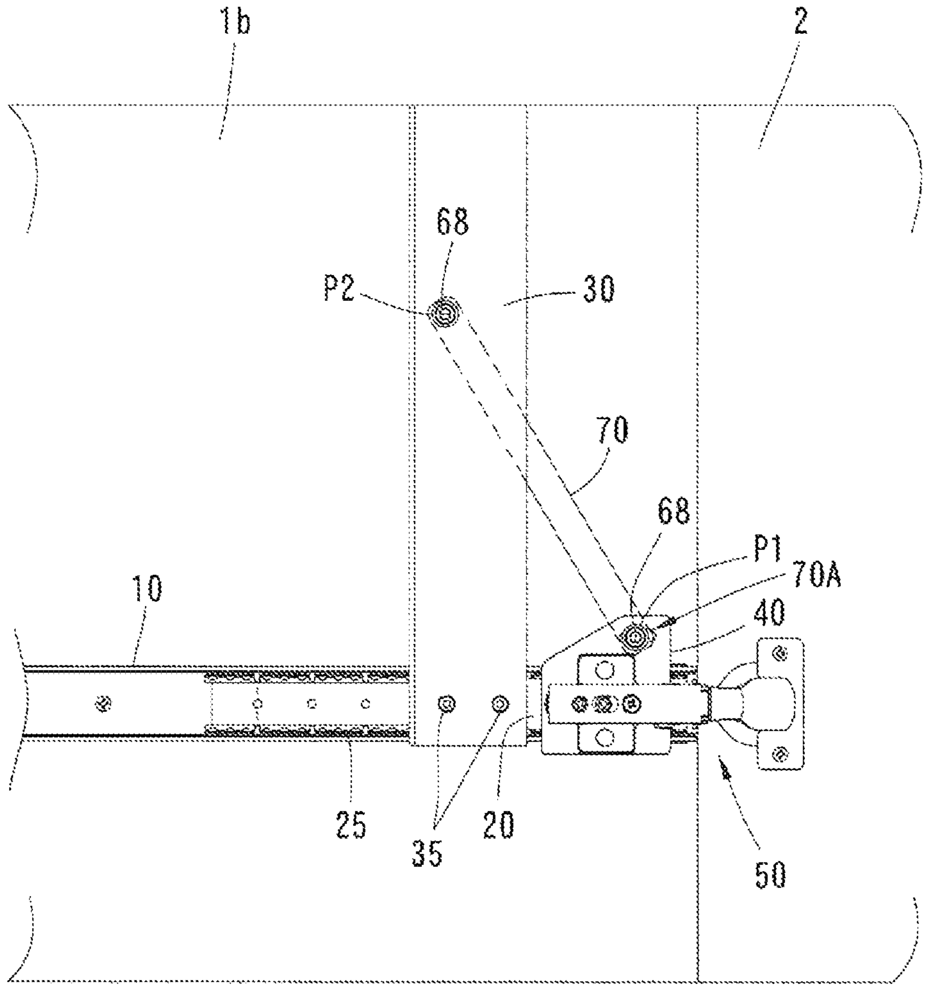
FIG. 5 is a side view showing enlarged elemental parts of the door guiding device according to a second embodiment of the present invention.

Next, other embodiments of the present invention will be described. In these embodiments, the component parts corresponding to the first embodiment will be referred by the same numerals, and their detailed description will be omitted. In the second embodiment shown in FIG. 5-FIG. 7, instead of the turnbuckle 60 of the first embodiment, a support member 70 consisted of one rigid body, for example, a thin and long plate is used. In the support member 70, one end is linked with the upper part of the linking bracket 40 as described later and another end is linked rotatably to the interlocking frame 30 by using the washer 66, spacer 67, screw 68 (fastener member) and nut 69 similar to the first embodiment (refer to FIG. 4).

Figure 6:
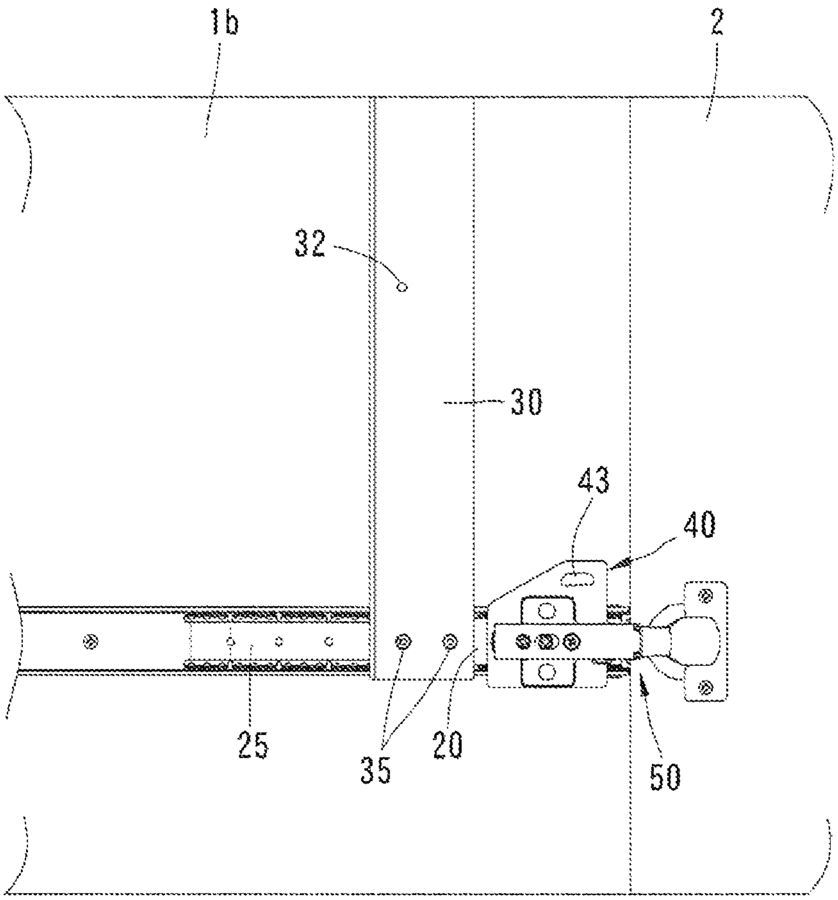
FIG. 6 is a drawing corresponding to FIG. 5 and illustrates the condition where a support member is removed in the second embodiment.
Figure 7:
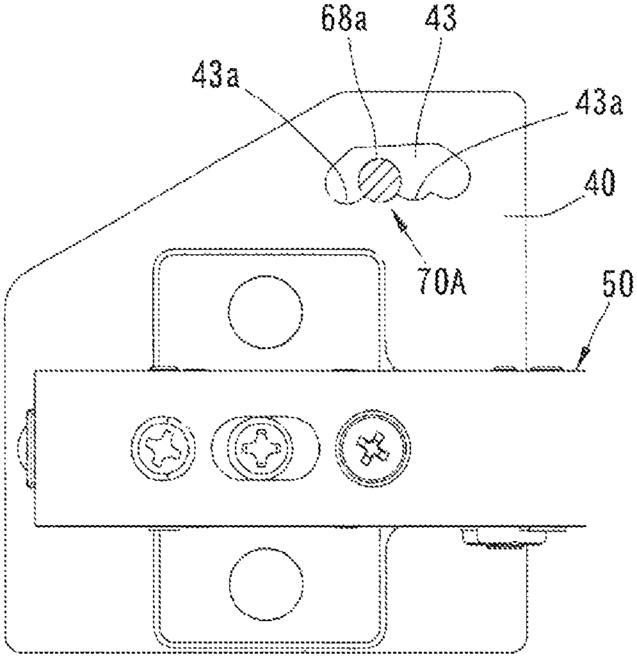
FIG. 7 is an enlarged side view of a linking bracket used in the second embodiment.

Circular holes (not shown in figures) are formed at both ends of the support member 70, and the respective screws 68 passes therethrough. As shown in FIG. 6 and FIG. 7, at the upper end of the linking bracket 40, instead of the circular holes 42 of the first embodiment, a long hole 43 extending to the back-and-forth direction is formed, and into this long hole 43, the shaft part **68*a* (engaging shaft part) of the screw 68** passes through.

At a lower edge of this long hole 43, a plurality of engagement recesses **43*a***, for example four, is formed.

In the second embodiment, prior to the position correction, the screw 35 for linking the upper and lower sliders 20 and the interlocking frame 30 is loosened. When correcting the position, the rotational axis line of the door 2 is set vertical by holding the door 2 and the door 2 is set to the vertical standing position. In this position, the shaft part **68*a* of the screw 68 at the linking part P1 is made selectively engage to one of four engagement recesses 43*a*. As such manner, the angle between the slider 20 and the interlocking frame 30 is adjusted, and the adjusted angle is kept by the support member 70. After completion of the correction work, the screw 35** is tightened.

As understood the foregoing descriptions, by the long hole 43 having the engagement recess **43*a* and the shaft part 68*a* of the screw 68, an adjustment component 70A for correcting the position of the door 2 is formed. According to the present embodiment, the support member 70 is formed by one rigid body so that the support member 70** may further be simplified and lower costs may be promoted. Other actions are the same with those of the first embodiment.

In the second embodiment, one end of the support member 70 may be linked rotatably to the linking bracket 40 and the adjustment component similar to the above may be disposed to the linking part P2. In this instance, a long hole is formed to the interlocking frame 30, and a plurality of engagement recess parts is formed at the upper edge of this long hole.

Third Embodiment

Figure 8:
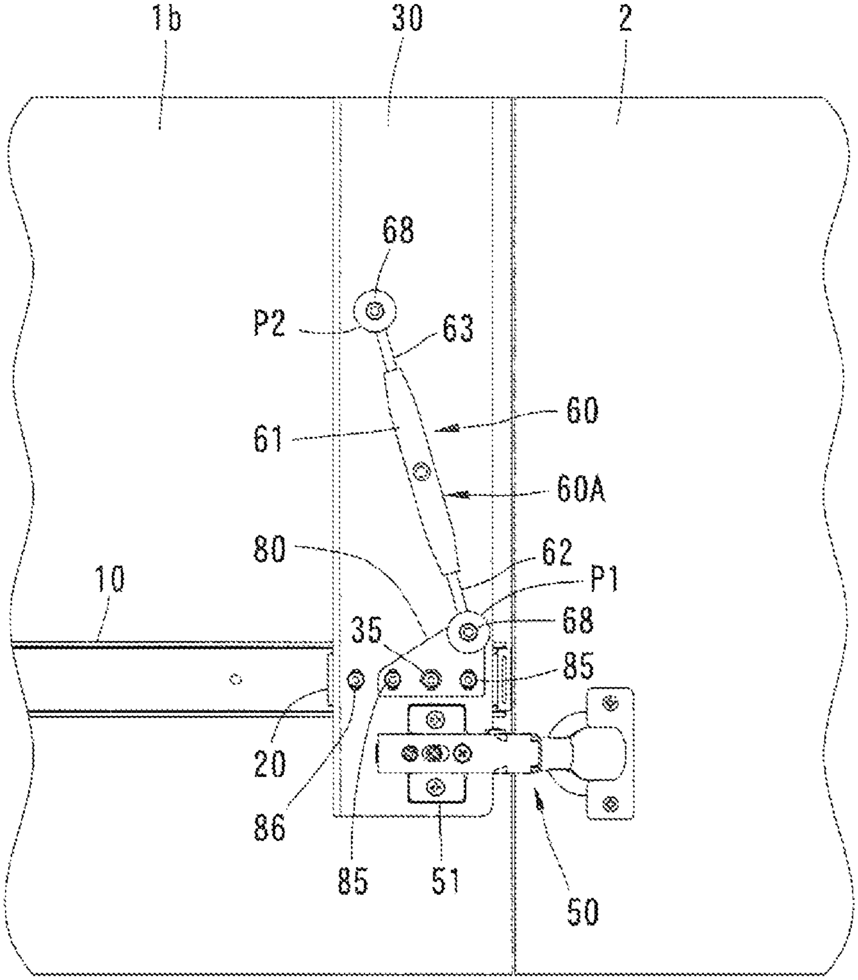
FIG. 8 is a side view showing enlarged elemental parts of the door guiding device according to a third embodiment of the present invention.
Figure 9:
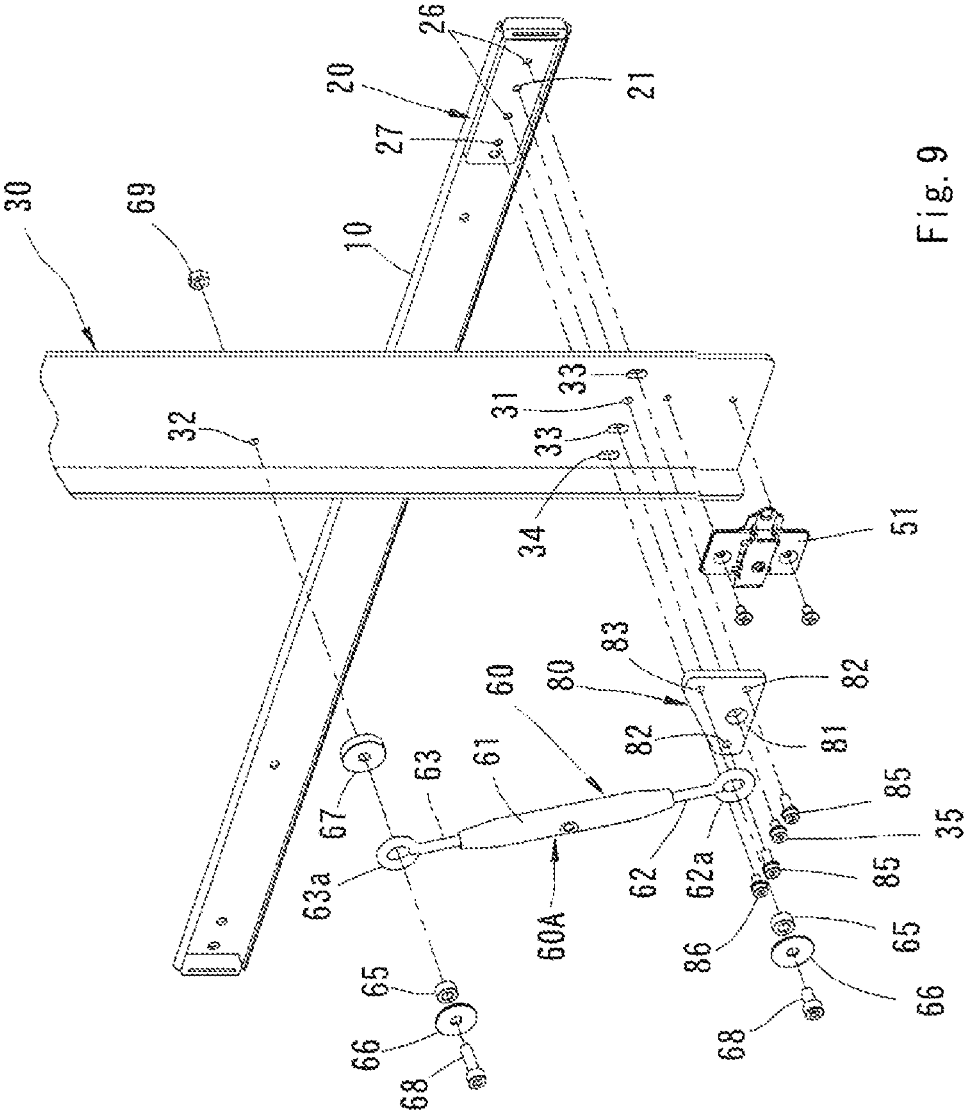
FIG. 9 is an exploded perspective view of the same door guiding device.

In the third embodiment shown in FIG. 8 and FIG. 9, the turnbuckle 60 is used similarly to the first embodiment. According to the present embodiment, the lengths of the upper and lower sliders 20 along the back-and-forth direction are shorter than that of the first embodiment.

The interlocking frame 30 is somewhat wider than that of the first embodiment and is linked with the upper and lower sliders 20 such that the entire length or the substantially entire length of the slider 20 is covered. The interlocking frame 30 protrudes to a lower direction beyond the linking part to the lower slider 20 and the housing-side hinge body 51 of the lower hinge mechanism 50 is linked with the protruded end. Though being not shown in the figure, the interlocking frame 30 protrudes to an upper direction beyond the linking part with the upper slider 20 and the housing-side hinge body 51 of the upper hinge mechanism 50 is linked with the protruded end.

To the interlocking frame 30, the turnbuckle 60 (support member) and the linking bracket 80 are disposed while overlapping each other at the opposite side of the lower slider 20. To the lower center of the linking bracket 80, a releasing hole 81 being consisted of a circular hole with a large diameter is formed and circular holes 82 are formed at both sides thereof. The interlocking frame 30 is formed with one circular hole 31 at the position corresponding to the releasing hole 81 of the linking bracket 80 and is formed with a releasing hole 33 consisted of a long hole extending vertically at the position corresponding to the circular hole 82 of the linking bracket 80.

By passing one screw 35 into the releasing hole 81 of the bracket 80 and the circular hole 31 of the interlocking frame 30 and then screwing into the screw hole 21 of the slider 20, the interlocking frame 30 and the slider 20 are linked at one point.

By passing two screw 85 (fastener member) into the circular hole 82 of the bracket 80 and the releasing hole 33 of the interlocking frame 30 and then screwing into the screw hole 26 of the slider 20, the linking bracket 80 is fixed to the slider 20 through the interlocking frame 30. This linking bracket 80 is provided as a part of the slider 20. The interlocking frame 30 and the slider 20 are rotatable relatively about the above screw 35 (that is, the angle is adjustable).

Now, an assistant screw 86 passes through the long hole 34 of the interlocking frame 30 and is screwed into the screw hole 27 of the slider 20. This assistant screw 86 does not become an obstacle for the angle adjustment between the interlocking frame 30 and the slider 20.

The ring part 63*a* of the turnbuckle 60 is linked rotatably with the interlocking frame 30 similar to the first embodiment. The ring part 62*a* of the turnbuckle 60, by screwing the screw 68 passing through the collar 65 and the washer 66 into the screw hole 83 formed at the upper part of the linking bracket 80, is linked rotatably to the linking bracket 80.

Though being not shown in the figure, the slider 20 supported by the upper guiding rail and the interlocking frame 30 may be linked likely, however, the turnbuckle can be omitted.

In the above architecture, since the correction work for the position of the door 2 by the length adjustment of the turnbuckle 60 is the same with that of the first embodiment, detailed description will be omitted. Prior to the position correction work, the screw 35, 85, and 86 are loosened and are fastened after the completion of the position correction work. In the position correction work by the turnbuckle 60, the angle between the slider 20 and the interlocking frame 30 is adjusted by the relative rotation about one screw 35.

According to the present embodiment, by disposing the linking bracket 80 to the interlocking frame 30 in overlapped arrangements, the length of the slider 20 can be shortened such that the door 2 can be received further inside in the housing 1 more than that of the first embodiment.

Fourth Embodiment

Figure 10:
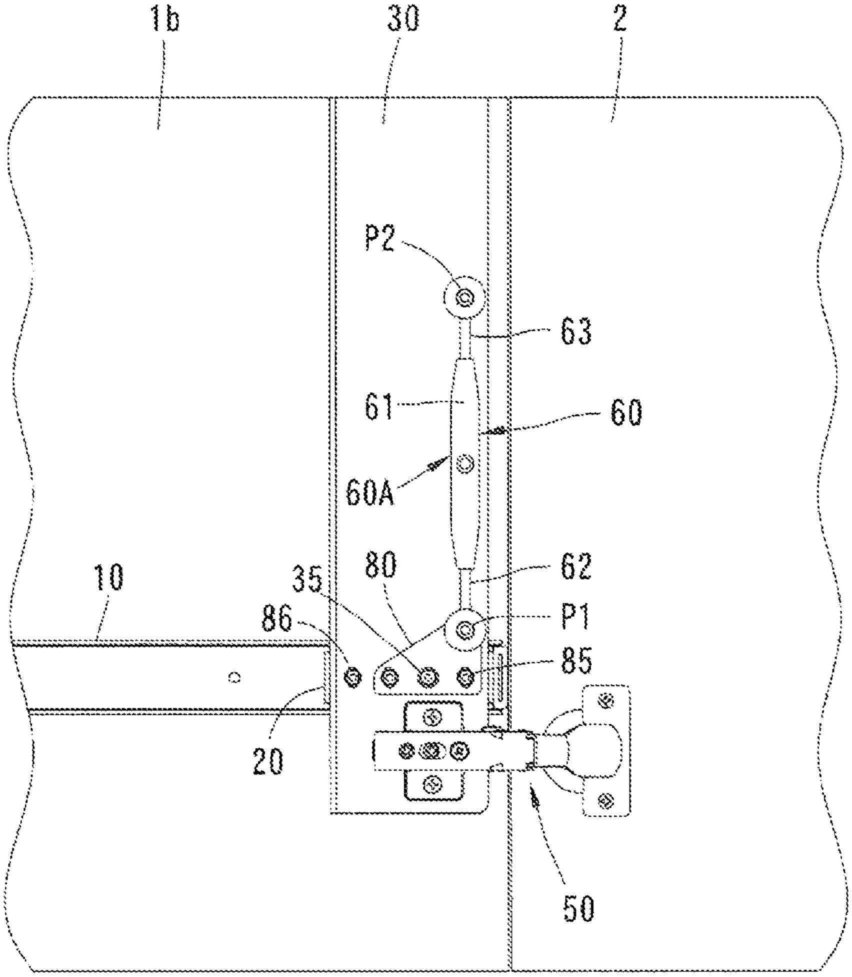
FIG. 10 is a side view showing enlarged elemental parts of the door guiding device according to a fourth embodiment of the present invention.
Figure 11:
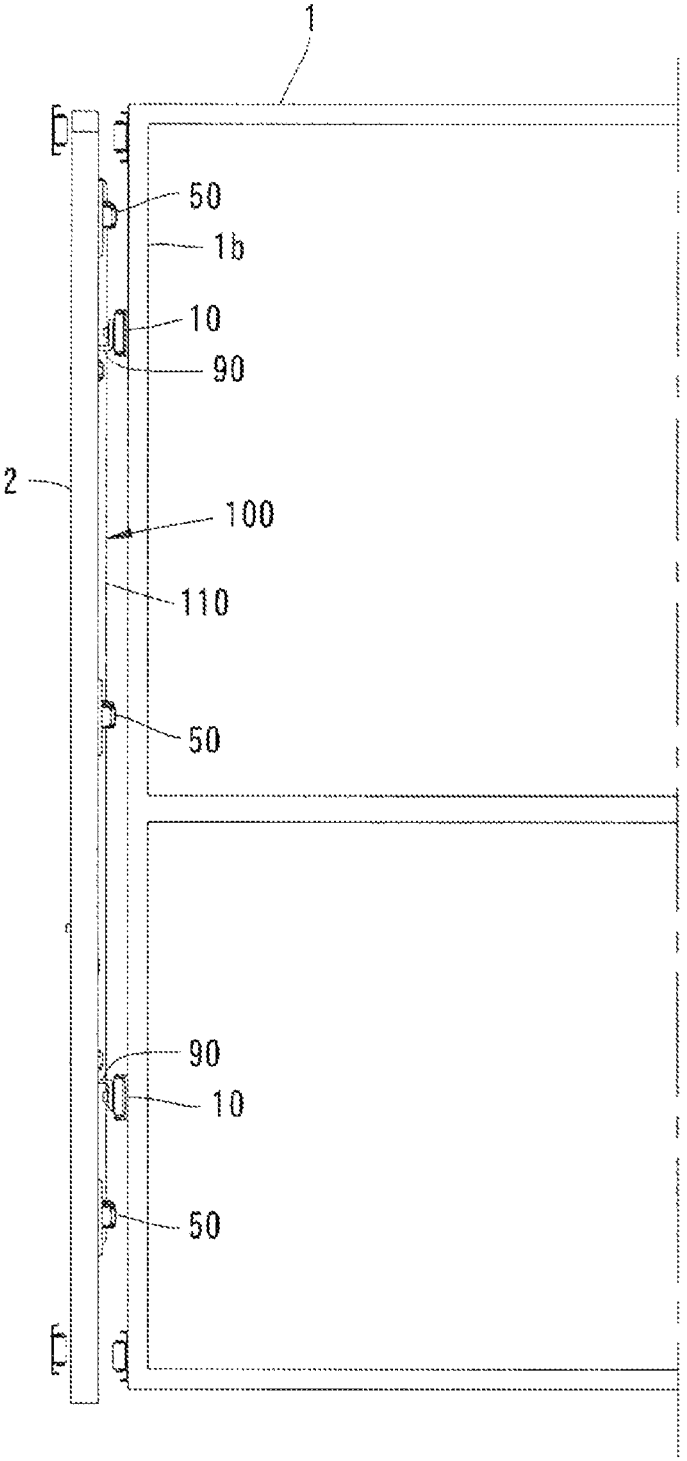
FIG. 11 is a front view of a door guiding device according to a fifth embodiment of the present invention and illustrates the condition where the door is pushed in toward the housing from an opened position at 90 degrees.

In the door guiding device according to the fourth embodiment shown in FIG. 10, the turnbuckle 60 (support member) is positioned vertically. To the line to which the turnbuckle 60 is positioned, the screw 35 (that is, the rotational center for the angle adjustment between the slider 20 and the interlocking frame 30) is positioned at a shifted position. Since other configurations are the same with the third embodiment, then the same numerals are used, and the description will be omitted.

Fifth Embodiment

Figure 12:
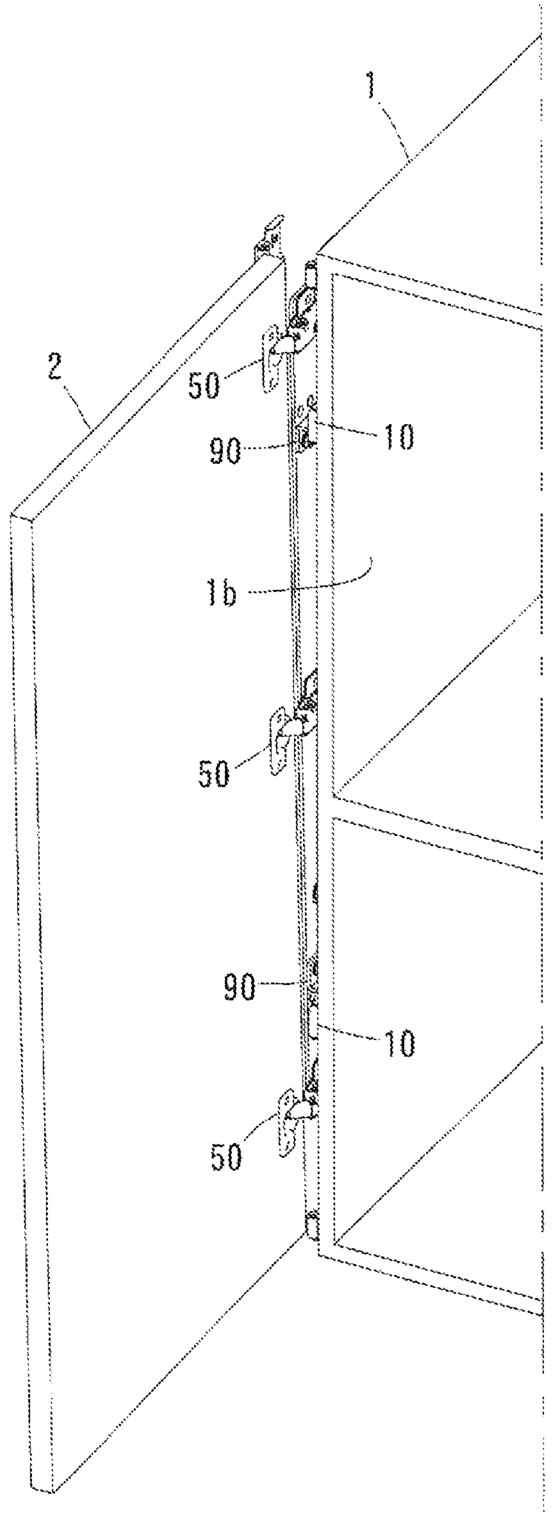
FIG. 12 is a perspective view of the same furniture and shows the condition where a forward-inclined door is opened by 90 degrees.
Figure 14:
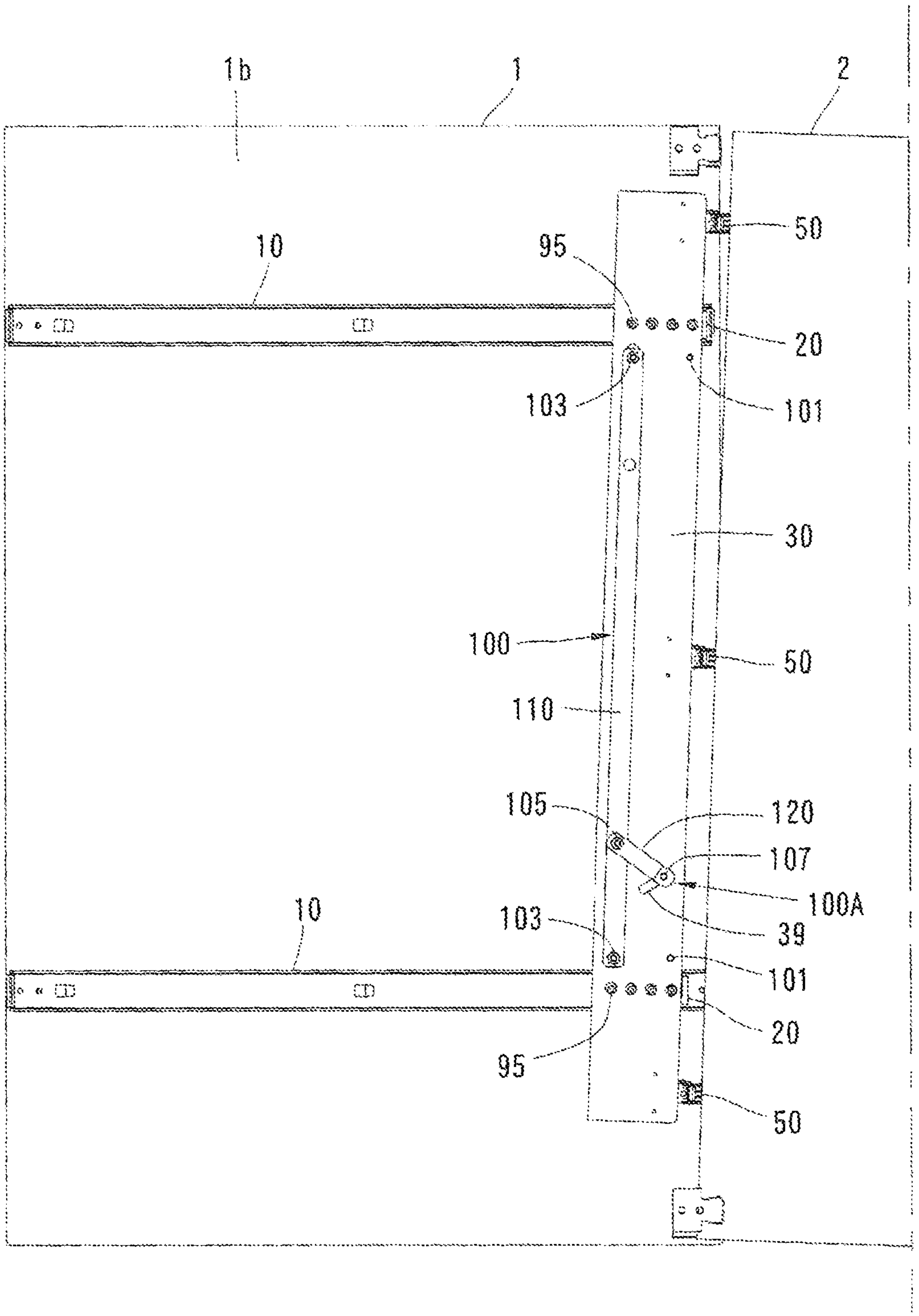
FIG. 14 is a left-side view of the same door guiding device and shows the condition where a door is opened by 90 degrees.
Figure 15:
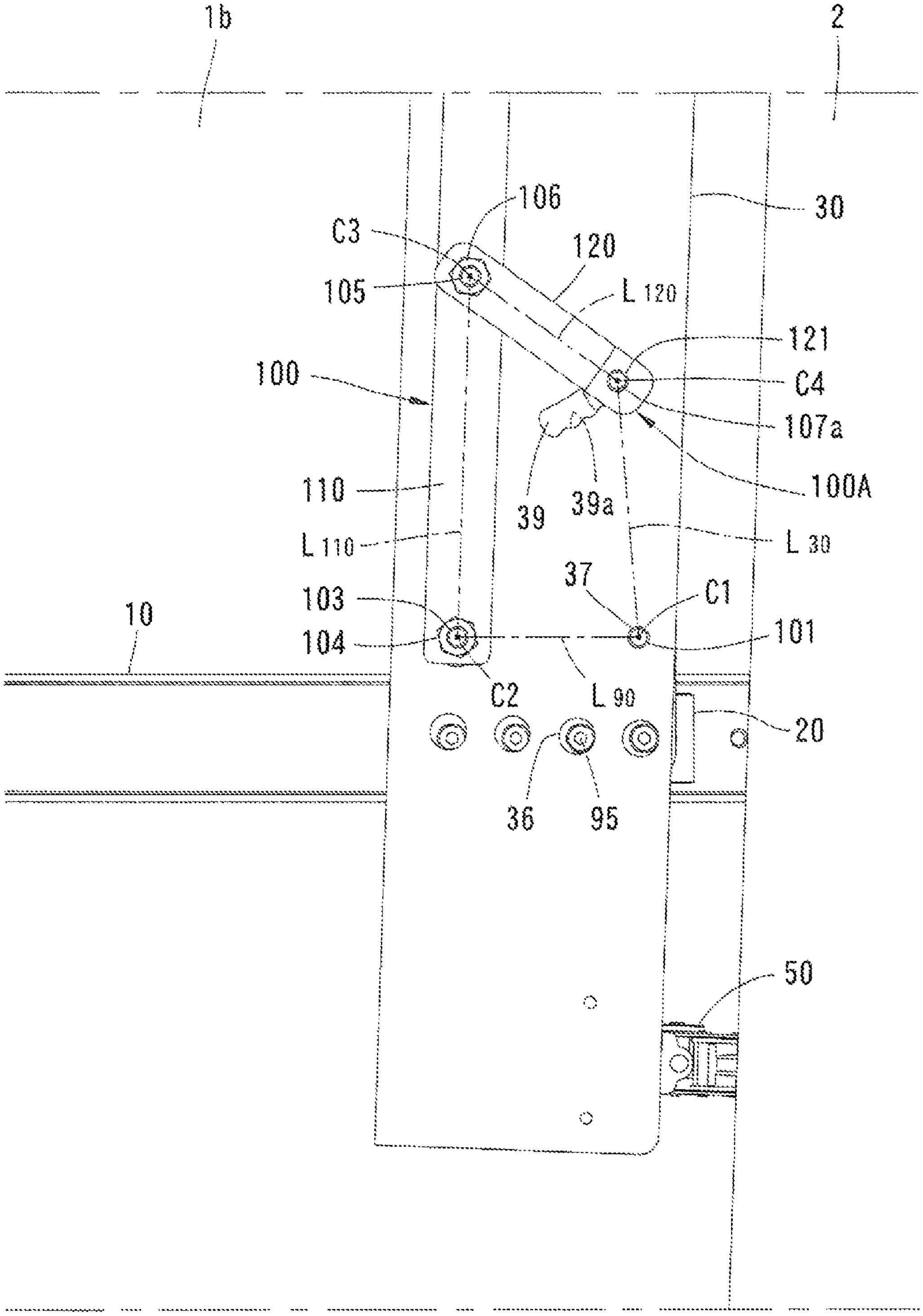
FIG. 15 is an enlarged side view of elemental parts.

Next, with reference to FIG. 11-FIG. 15, the door guiding device of the fifth embodiment according to the present invention will be described. In FIG. 12, FIG. 14, and FIG. 15, the door 2 is illustrated in the condition under the forward-inclined position before the position correction.

In the present embodiment, the door 2 is pushed in along the outer face of the lateral wall 1*b* of the housing 1 from the open position and the plural, for example, two guiding rails 10 extending horizontally to the back-and-forth direction are fixed to the outer face of the lateral wall 1*b* on the housing 1. The door 2, likely to the third and fourth embodiments, is supported by the plural hinge mechanisms 50 disposed to the interlocking frame 30.

Figure 13:
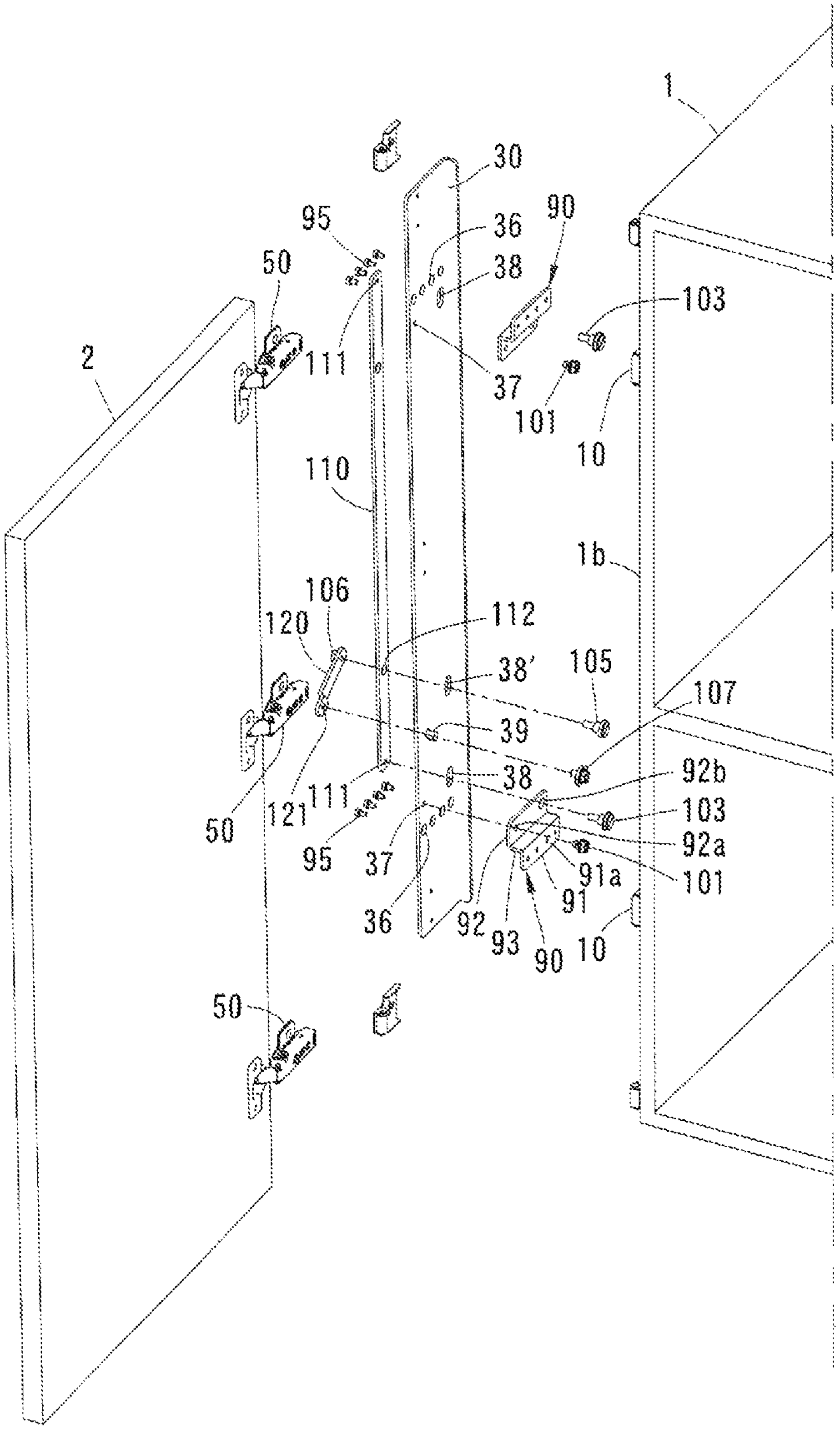
FIG. 13 is a perspective view showing the exploded same door guiding device.

As shown in FIG. 13, between the upper and lower sliders 20 and the interlocking frame 30, the linking bracket 90 is disposed as being overlapped to the interlocking frame 30. This linking bracket 90 has a crank shape and comprises a vertical wing part 91 along the guiding rail 10, a vertical wing part 92 along the interlocking frame 30 and an intermittent horizontal wing part 93 connecting both of them. By screwing the screw 95 passing through four circular holes 91*a* formed to the vertical wing part 91 into the screw hole of the slider 20, the linking bracket 90 is fixed to the slider 20. The linking bracket 90 is provided as a part of the slider 20. These screw 95 can be screwed through large diameter-working holes 36 formed near the upper and lower ends of the interlocking frame 30.

A circular hole 92*a* is formed at the front end of the vertical wing part 92 of the upper and lower linking brackets 90 and by screwing the screw 101 through the circular hole 92*a* into the respective upper and lower screw hole 37 of the interlocking frame 30, the interlocking frame 30 is linked with the upper and lower brackets 90 at one point. This screw 101 becomes the center for the relative rotation when adjusting the angle between the interlocking frame 30 and the upper and lower slider 20.

As shown in FIG. 13-FIG. 15, the door guiding device of the present embodiment comprises a support mechanism 100 (support component) disposed at the outside of the interlocking frame 30 (opposite to the lateral wall 1*b*). This support mechanism 100 comprises a first support member 110 extending long toward the up and down direction and a second inclined support member 120. These support members 110, 120 are each consisted of thin and long planar rigid body and are disposed with overlapping to the interlocking frame 30.

To the rear end of the vertical wing part 92 of each of the upper and lower linking brackets 90, the circular hole 92*b* is formed; a circular hole 111 is formed at each of the upper and lower ends of the first support member 110; and the long hole 38 extending to the up-and-down direction at the corresponding position of the interlocking frame 30 is formed. By these circular hole 92*b*, 111, a screw 103 passing through the long hole 38 and the nut 104 (shown only in FIG. 15), the upper and lower linking brackets 90 (upper and lower slider 20) and the upper and lower ends of the first support member 110 are linked rotatably.

To the first support member 110, a circular hole 112 is formed at a certain distance upward from the lower end and to the corresponding position of the interlocking frame 30, the long hole 38' extending up-and-down is formed. By screwing a screw 105 passing through the circular hole 112 and the long hole 38' to the nut 106 fixed to one end of the second support member 120, the first support member 110 and the second support member 120 are linked rotatably about the screw 105.

Since the above screw 103 passes through the long hole 38 of the above interlocking frame 30 and the screw 105 passes through the long hole 38', the first support member 110 can shift to the vertical direction (longitudinal direction of the interlocking frame 30) against the interlocking frame 30.

To another end of the second support member 120, a screw hole 121 is formed and to the interlocking frame 30, a long hole 39 is formed at the position corresponding to this screw hole 121. In this embodiment, the long hole 39 has an arch shape and extends slantly back-and-forth. A plurality of engagement recesses 39*a* are formed along the lower edge of the long hole 39. The screw 107 is passed through the long hole 39 of the interlocking frame 30 and is screwed into the screw hole 121 of the second support member 120. The shaft part 107*a* (engagement shaft part) of this screw 107 is selectively engaged to the plurality of engagement recesses 39*a* of the long hole 39 likely to the second embodiment. By this shaft part 107*a* and the long hole 39, the adjustment component 100A is configured.

The first support member 110, the second support member 120, the linking bracket 90 and the interlocking frame 30 configure the link mechanism shown by one dot chain lines in the figure. The link $L_{90}$ is configured by the linking bracket 90; the link $L_{30}$ is configured by the interlocking frame 30; the link $L_{110}$ is configured by the first support member 110 and the link $L_{120}$ is configured by the second support member 120. The linking point C1 between the link $L_{30}$ and the Link Loo is configured by the screw 101; the linking point C2 between the link $L_{90}$ and the link $L_{110}$ is configured by the screw 103; the linking point C3 between the link $L_{110}$ and the link $L_{120}$ is configured by the screw 105 and the linking point C4 between the link $L_{30}$ and the link $L_{120}$ is configured by the screw 107. While the linking points C1-C4 link the links rotatably, since the first support member 110 forming the link $L_{110}$ is linked with the upper and lower sliders 20, the link mechanism can be uniquely positioned when the engagement position of the shaft part 107*a* of the screw 107 to the engagement recess 39*a* is determined.

In the fifth embodiment, the position correction process of the door 2 at the forward-inclined position will be described with reference mainly to FIG. 14 and FIG. 15. Under the course where the door 2 is held by the hand to set the vertical standing position from the forward-inclined position (the rotational axis line of the door 2 is set vertical), the interlocking frame 30 rotates to the back direction, that is, to the counterclockwise direction in the figure about the linking point C1 (screw 101) against the slider 20 (linking bracket 90) and accordingly, the first support member 110 of the support mechanism 100 also rotates to the same direction with the interlocking frame 30. Since the rotation center of the first support member 110 is the linking point C2 (screw 103) and is apart from the linking point C1 (screw 101) which is the rotation center of the interlocking frame 30, the first support member 110 shifts to the longitudinal direction (up-and-down direction) against the interlocking frame 30.

Accompanied with the counterclockwise rotation of the first support member 110, the linking point C3 (screw 105) between the first support member 110 and the second support member 120 shifts to the back direction. Accordingly, the linking point C4, that is, the engagement position of the shaft part 107*a* of the screw 107 at another end of the second support member 120 moves to the engagement recess 39*a* at the front side to the engagement recess 39*a* at the rear side. As such, the angle between the interlocking frame 30 and the slider 20 can be adjusted so as to set the door 2 in the vertical standing position.

The adjusted angle is kept by the first support member 110 and the second support member 120, and as the result, the vertical standing position of the door 2 (vertical condition of the rotation shaft line of the door 2) can be kept.

Figure 16:
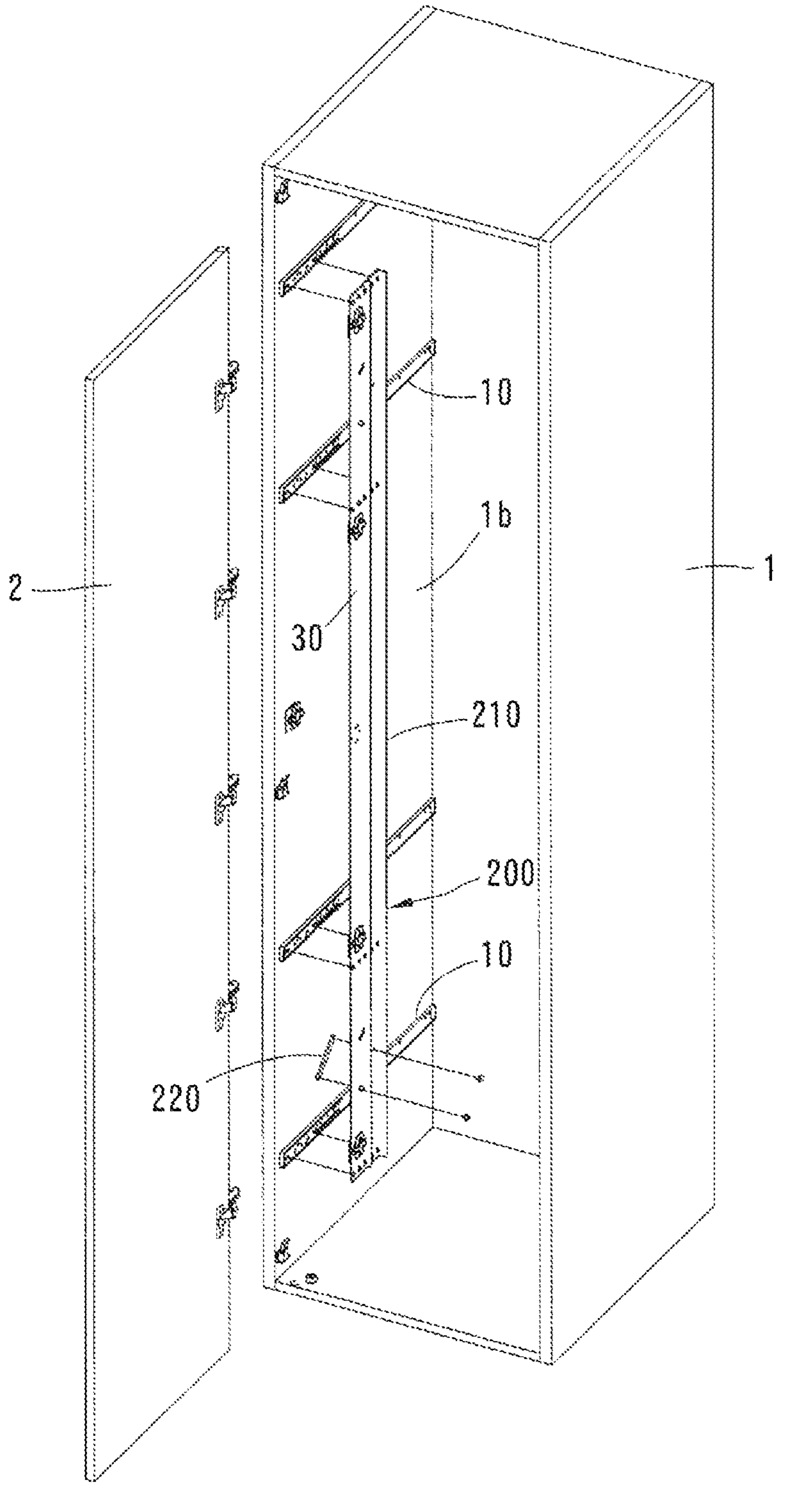
FIG. 16 is a perspective view showing a door guiding device of a sixth embodiment according to the present invention under exploded condition together with the furniture.
Figure 17:
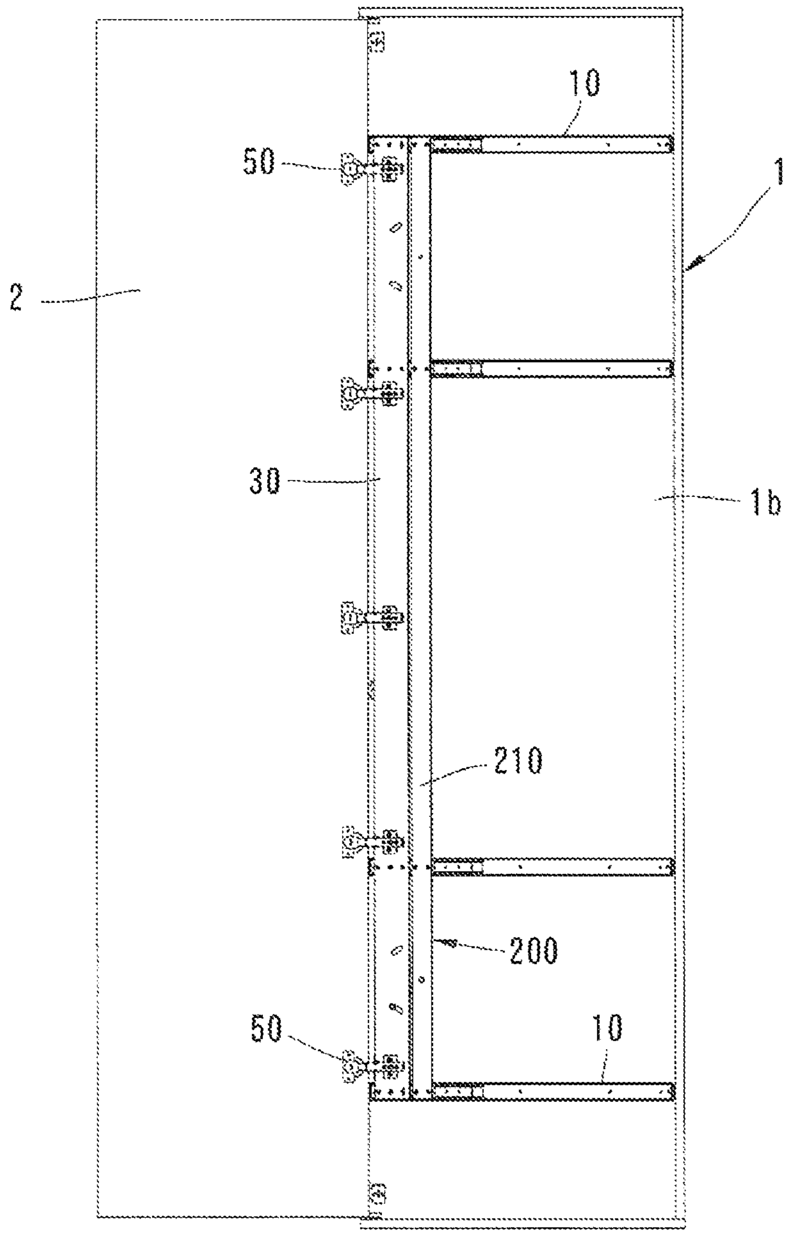
FIG. 17 is side view of the same door guiding device viewed from the inside of the furniture.
Figure 18:
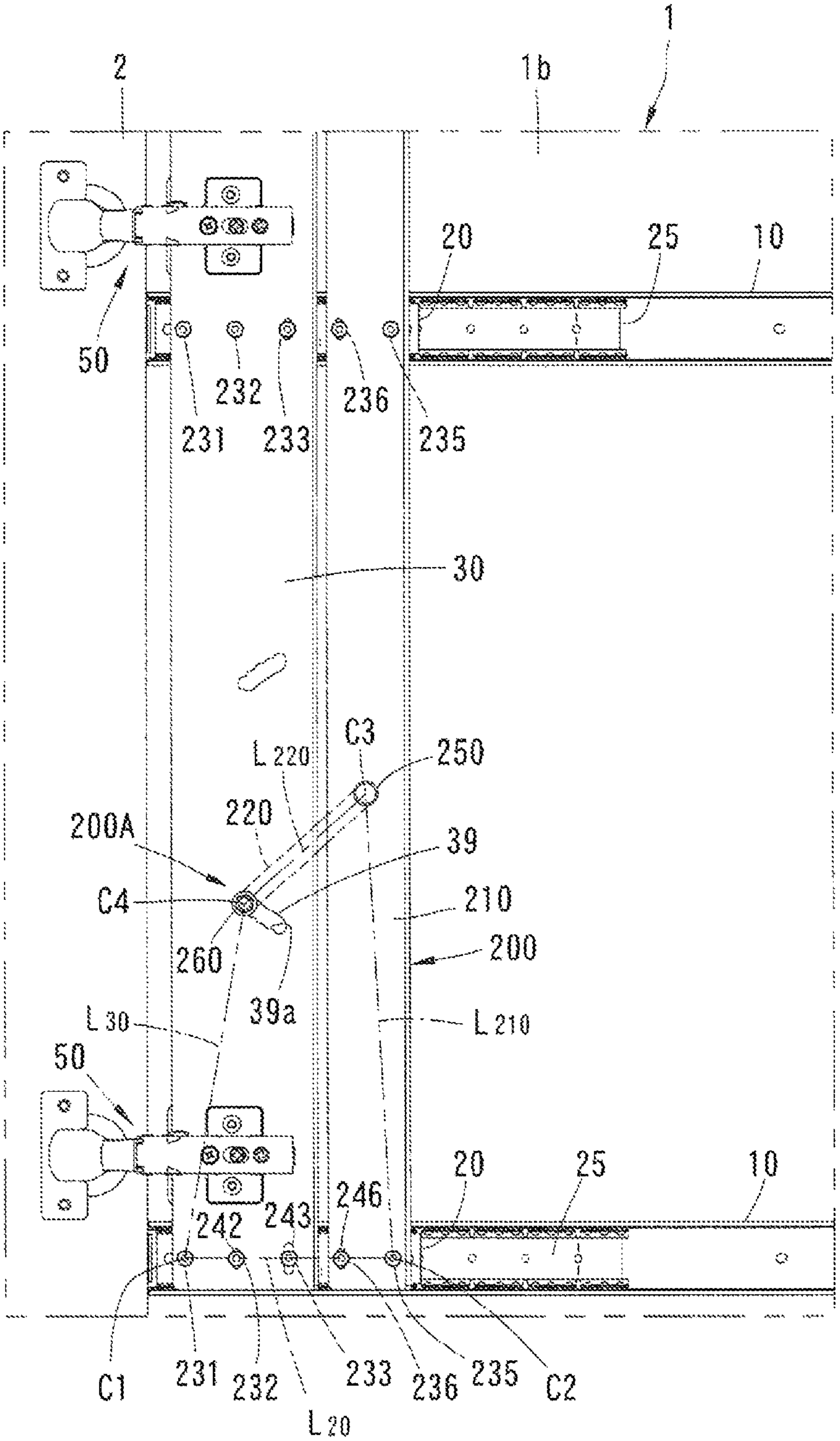
FIG. 18 is an exploded perspective view of the same door guiding device.

A door guiding device of the sixth embodiment shown in FIG. 16-FIG. 18 comprises four (plural) guiding rails 10 fixed to the inner face of the lateral wall 1*b* of the housing 1. The interlocking frame 30 is linked directly to each of the sliders 20 through three screws 231, 232, and 233. To the interlocking frame 30, the hinge mechanism 50 is fixed in the vicinity to the slider 20.

The screw 231 nearest to the front edge of the interlocking frame 30 is screwed into the screw hole of the slider 20 through the circular hole formed to the interlocking frame 30 (any of them is not shown in the figure) and other screws 232, 233 are screwed into the screw hole of the slider 20 through vertically elonged releasing holes 242, 243 formed to the interlocking frame 30. The releasing hole 243 near to the rear edge of the interlocking frame 30 is longer than the releasing hole 242 at the middle position. The lengths of the releasing holes 242, 243 is the longest at the lowest stage and gradually becomes shorter toward upper stages. By this linking configuration, the interlocking frame 30 can be adjustable in the angle against the sliders 20 at each stage about the forward screw 231.

Sixth Embodiment

In the sixth embodiment, the support mechanism 200 (support component) likely to the fifth embodiment is used. This support mechanism 200 comprises a first support member 210 extending long to the up-and-down direction and an inclined second support member 220. These support members 210, 220 are each consisted of a thin and long planar rigid body.

The first support member 210 of the present embodiment is different from that of the fifth embodiment and does not overlap with the interlocking frame 30 while being disposed at the rear direction of the interlocking frame 30. The first support member 210 is directly linked with the sliders 20 at each stage by two screws 235, 236. The screw 235 at the rear side is screwed into the screw hole pf the slider 20 (any of them is not shown in the figure) through the circular hole formed to the first support member 210 and the screw 236 at the front side is screwed into the screw hole of the slider 20 through the vertically elonged releasing hole 246 formed to the first support member 210. With this linking configuration, when the interlocking frame 30 is adjusted in the angle against the sliders 20 at each of the stage, the first support member 210 can be rotatable about the screw 235 against the slider 20.

The support member 210 is formed with a circular hole at a certain distance upward from the lower end (not shown in figure) and by fixing and caulking a pin 250 passing through the circular hole to the second support member 220, the first support member 210 and the second support member 220 is linked rotatably about the pin 250.

Another end of the second support member 220 is formed with a screw hole (not shown in figure) and the interlocking frame 30 is formed with the long hole 39. The plurality of engagement recesses 39*a* is formed along the lower edge of the long hole 39. A screw 260 is passed through the long hole 39 of the interlocking frame 30 and is screwed into the screw hole of the second support member 220. This shaft part (engagement shaft part) of the screw 260 is engaged selectively with one of the plurality of the engagement recesses 39*a* of the long hole 39. By the shaft part of this screw 260 and the long hole 39, the adjustment component 200A is configured.

The first support member 210, the second support member 220, the slider 20 and the interlocking frame 30 configure the link mechanism shown by one dot chain lines shown in figures. The link $L_{20}$ is configured by the slider 20; the link $L_{30}$ is configured by the interlocking frame 30; the link $L_{210}$ is configured by the first support member 210 and the link $L_{220}$ is configured by the second support member 220. The linking point C1 between the link $L_{30}$ and the Link $L_{20}$ is configured by the screw 231; the linking point C2 between the link $L_{20}$ and the link $L_{210}$ is configured by the screw 235; the linking point C3 between the link $L_{210}$ and the link $L_{220}$ is configured by the pin 250 and the linking point C4 between the link $L_{30}$ and the link $L_{220}$ is configured by the screw 260.

Since the position correction process of the door 2 in the sixth embodiment is the same with that of the fifth embodiment, detailed description will be omitted. Prior to the position correction process, it is preferred that the screws 231-233 for linking the sliders 20 of each stage and the interlocking frame 30 and the screws 235, 236 for linking the sliders 20 of each stage and the first support member 210 are loosened and are tightened after the completion of the position adjustment process.

The present invention is not limited by the above embodiments and may adopt various modifications within the range that departs scope thereof.

In the first embodiment shown in FIG. 1-FIG. 4, the interlocking frame 30 may be disposed at the front side of the upper and lower sliders 20. In this instance, the lower linking bracket 40 is disposed at the rear side of the slider 20 and the turnbuckle 60 becomes the reverse inclination to that of the first embodiment such that the position of the door can be corrected by making the length of the turnbuckle 60 shorter. In this configuration, since the hinge mechanism 50 is disposed to the interlocking frame 30, the upper linking bracket 40 is not necessary. The second embodiment can also adopt the similar configuration.

In the first-sixth embodiments, the support component may be disposed at upper region of the door guiding device and may be disposed at both of the upper and lower regions.

The opening of the housing may be opened and closed through two left and right doors. In this instance, the door guiding device may be required two pairs.

In the first-fourth, and the sixth embodiments, the door may be pushed in along the outer face of the housing from the open position. In this instance, the guiding rails are fixed to the outer face. Similarly, in the fifth embodiment, the door may be pushed in along the inner face of the lateral wall.

In the above-described embodiments, while the hinge mechanism having four movable rotational axis lines, the hinge mechanism having simpler configuration with one rotational axis line (so called one axis hinge) may be used. This rotational axis line is fixed at a certain position and does not move.

In the above-described embodiments, while the plurality of hinge mechanisms are used, one thin and long hinge mechanism extending vertically may be used. In this instance, the hinge mechanism may be attached to the vertical frame.

The number of the guiding rails may be adequately selected depending on the weight of the door.

In the embodiment that the hinge mechanism for supporting the door is disposed to the vertical frame, and when the door is light weight, the guiding rails may be one. In this embodiment, configuration of aforementioned first-sixth embodiments may be adequately adopted.

In the case where the door guiding device is disposed to a predetermined receiver body and door, since the extent of the forward inclination of the door is known, the angle between the vertical frame and the slider for allowing the door to keep as the vertical position may be obtained beforehand. Thus, connection parts (for example, the position of the engagement hole) are formed to the vertical frame and the slider, respectively for allowing this angle to be kept, and both ends of the support member consisted of the rigid body may be connected to these connection part. In this instance, the adjustment component will be omitted.

INDUSTRIAL AVAILABILITY

The present invention can be applied as the guiding device of the push-in type door.

DESCRIPTION OF SIGNS AND NUMERALS

1 housing (receiver body)
1*a* opening
1*b* Lateral wall
2 door
5 door guiding device
10 guiding rail
20 slider
30 interlocking frame (vertical frame)
39 long hole
39*a* engagement recess
43 long hole
43*a* engagement recess
50 hinge mechanism
60 turnbuckle (support member; support component)
60A adjustment component
68*a* shaft part (engagement shaft part)
70 support member (support component)
70A adjustment component
100, 200 support mechanism (support component)
100A, 200A adjustment component
107*a* shaft part (engagement shaft part)
110, 210 first support member
120, 220 second support member
L rotational axis line
P1 first linking part (first end)
P2 second linking part (second end)
C1-C4 linking points (first-fourth linking points)

The invention claimed is:

1. A door guiding device for supporting a door for opening and closing an opening of a receiver body rotatably about a rotational axis line extending in a vertical direction while guiding the door inward from an opening position along a lateral wall of the receiver body, the door guiding device comprises:

a plurality of guiding rails extending horizontally along a horizontal direction, while being separated from each other and being fixed to the lateral wall of the receiver body, a plurality of sliders each supported by the plurality of guiding rails slidably in the horizontal direction, a vertical frame linked with the plurality of the sliders, and a hinge mechanism disposed on at least one slider of the sliders or the vertical frame for supporting the door rotatably about the rotational axis line, wherein a support component is located between the slider and the vertical frame, the support component comprises an adjustment component for correcting an angle between the slider and the vertical frame so as to correct the door to a vertical standing position by setting the rotational axis line vertical, the support component comprises at least one support member, the adjustment component is configured such that to be able to adjust a linking position between the at least one support member and the slider or the vertical frame, wherein the adjustment component comprises a long hole formed in the slider or in the vertical frame and an engagement shaft part being disposed on the at least one support member and passing through the long hole, and a plurality of engagement recesses is formed at an edge of the long hole, and the engagement shaft part engages selectively with any one of the plurality of the engagement recesses.

2. The door guiding device of claim 1, wherein at least one support member is consisted of one support member and the support member is linked with the slider through a first end and is linked with the vertical frame through a second end.

3. The door guiding device of claim 2, wherein an axis line connecting the first end and the second end of the support member is inclined.

4. The door guiding device of claim 2, wherein the first end of the support member is linked with the slider at a position apart from the vertical frame.

5. The door guiding device of claim 2, wherein the support member overlaps to the vertical frame and the first end is linked to the slider without restriction from the vertical frame.

6. The door guiding device of claim 1, wherein the at least one support member comprises a first support member and a second support member and the first support member extends in a longitudinal direction of the vertical frame,
  - the vertical frame is rotatably linked with the slider at a first linking point,
  - the first support member is rotatably linked with the slider at a second linking point apart from the first linking point in the horizontal direction,
  - one end of the second support member is rotatably linked with the first support member at a third linking point apart from the second linking point in the vertical direction, and
  - the adjustment component comprises the long hole formed to the vertical frame and the engagement shaft disposed to another end of the second support member such that the engagement shaft part is provided as a fourth linking point for linking the second support member and the vertical frame.

7. The door guiding device of claim 6, wherein the first support member and the second support member are overlapped on the vertical frame.

8. The door guiding device of claim 6, wherein the first support member is disposed apart from the vertical frame in the horizontal direction and the second support member is spanned between the first support member and the vertical frame.

9. The door guiding device of claim 1, wherein at least one support member is consisted of one support member and the support member is linked with the slider through a first end and is linked with the vertical frame through a second end.

10. A door guiding device for supporting a door for opening and closing an opening of a receiver body rotatably about a rotational axis line extending in a vertical direction while guiding the door inward from an opening position along a lateral wall of the receiver body, the door guiding device comprises:
  - a plurality of guiding rails extending horizontally along a horizontal direction, while being separated from each other and being fixed to the lateral wall of the receiver body,
  - a plurality of sliders each supported by the plurality of guiding rails slidably in the horizontal direction,
  - a vertical frame linked with the plurality of the sliders, and
  - a hinge mechanism disposed on at least one slider of the sliders or the vertical frame for supporting the door rotatably about the rotational axis line,
  - wherein a support component is located between the slider and the vertical frame,
  - the support component is linked with the slider through a first end and is linked with the vertical frame through a second end,
  - an adjustment component is configured so as to adjust a length of the support member, and
  - wherein the support member is consisted of a turnbuckle.

11. A door guiding device for supporting a door for opening and closing an opening of a receiver body rotatably about a rotational axis line extending in a vertical direction while guiding the door inward from an opening position along a lateral wall of the receiver body, the door guiding device comprises:
  - a plurality of guiding rails extending horizontally along a horizontal direction, while being separated from each other and being fixed to the lateral wall of the receiver body,
  - a plurality of sliders each supported by the plurality of guiding rails slidably in the horizontal direction,
  - a vertical frame linked with the plurality of the sliders, and
  - a hinge mechanism disposed on at least one slider of the sliders or the vertical frame for supporting the door rotatably about the rotational axis line,
  - wherein a support component is located between the slider and the vertical frame, and
  - the support component including a first support member and a second support member, the first support member extending in a longitudinal direction of the vertical frame, the second support member is rotatably connected to the first support member, and the first support member is rotatably connected to the slider.

* * * * *